United States Patent [19]

Scaramucci

[11] Patent Number: 4,781,214

[45] Date of Patent: Nov. 1, 1988

[54] SWING CHECK VALVE DISC

[76] Inventor: John P. Scaramucci, 10724 Woodridden, Oklahoma City, Okla. 73170

[21] Appl. No.: 60,249

[22] Filed: Jun. 9, 1987

Related U.S. Application Data

[63] Continuation-in-part of Ser. No. 23,786, Mar. 9, 1987, abandoned, and a continuation-in-part of Ser. No. 49,383, May 13, 1987.

[51] Int. Cl.$^4$ .............................................. F16K 15/03
[52] U.S. Cl. .................................................. 137/527
[58] Field of Search .................. 137/527, 527.2, 527.4, 137/527.6, 527.8

[56] References Cited

U.S. PATENT DOCUMENTS 2,532,067 11/1950 La Bour .
3,509,908 11/1970 Latham et al. .
3,604,453 9/1971 Boitnott ............................. 137/527
3,720,228 4/1973 Wheatley, Jr. .
4,605,041 8/1986 Teumer .

FOREIGN PATENT DOCUMENTS 11603 8/1854 France ............................. 137/527
3684 of 1911 United Kingdom ................ 137/527

OTHER PUBLICATIONS

Exhibit 1: Arrow Valve Co., Inc. (brochure); "Short Pattern Wafer Check, Fig. 8"; p. 22; Caney, Kans.; undated.
Exhibit 2: Eagle Valve Company, Inc. (brochure); "Eagle Check Valves, Series 12"; p. 4; Tulsa, Okla.; undated.

Primary Examiner—Robert G. Nilson
Attorney, Agent, or Firm—Dunlap, Codding & Peterson

[57] ABSTRACT

A disc for a swing check valve where the body of the disc and the hinge pins are cast as one piece to facilitate the alignment of the hinge pins with the sealing face of the disc. The swing radius of the disc is at a minimum and a spring closure is provided.

7 Claims, 3 Drawing Sheets

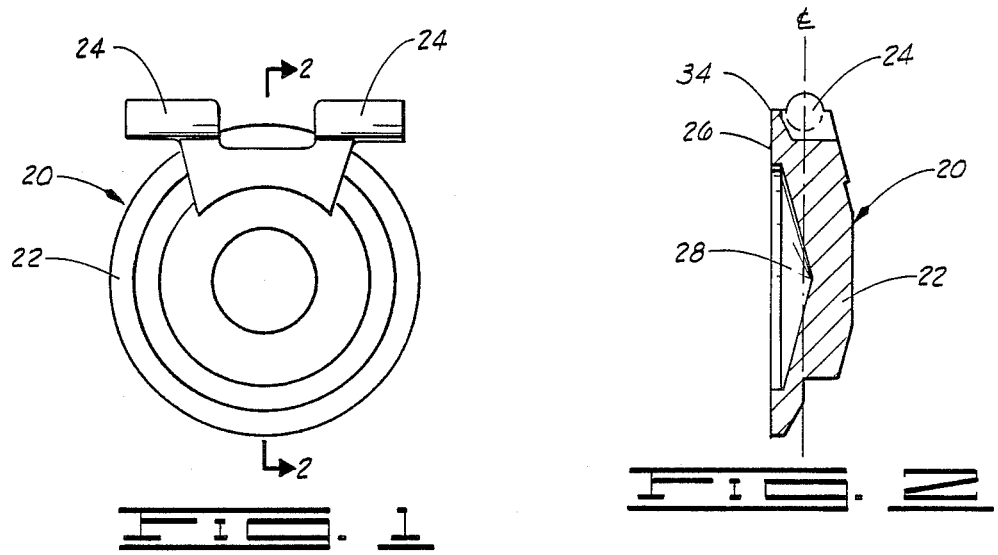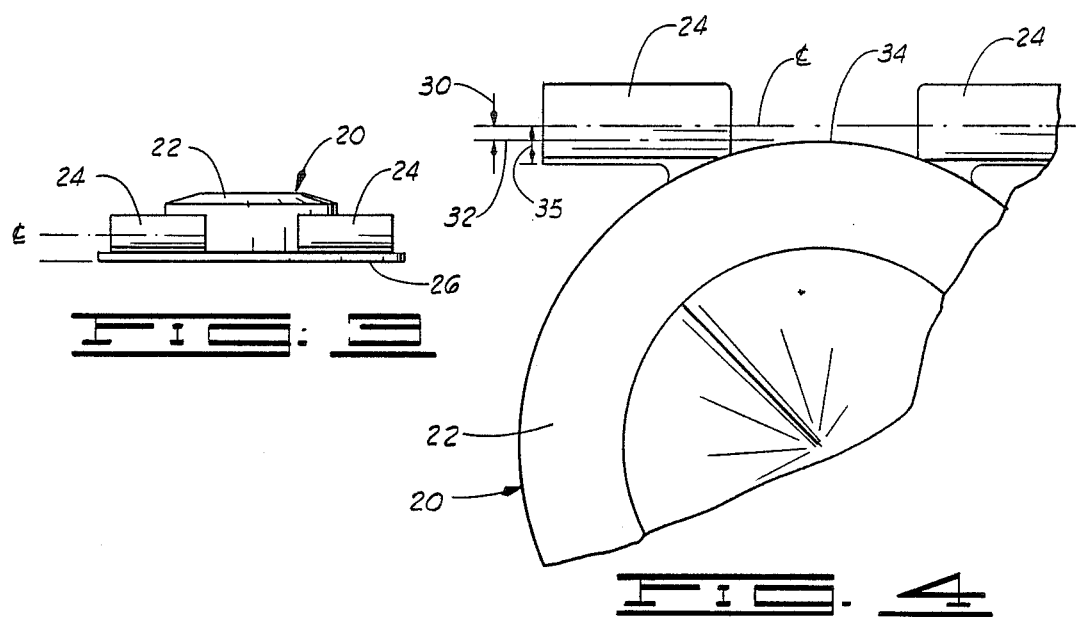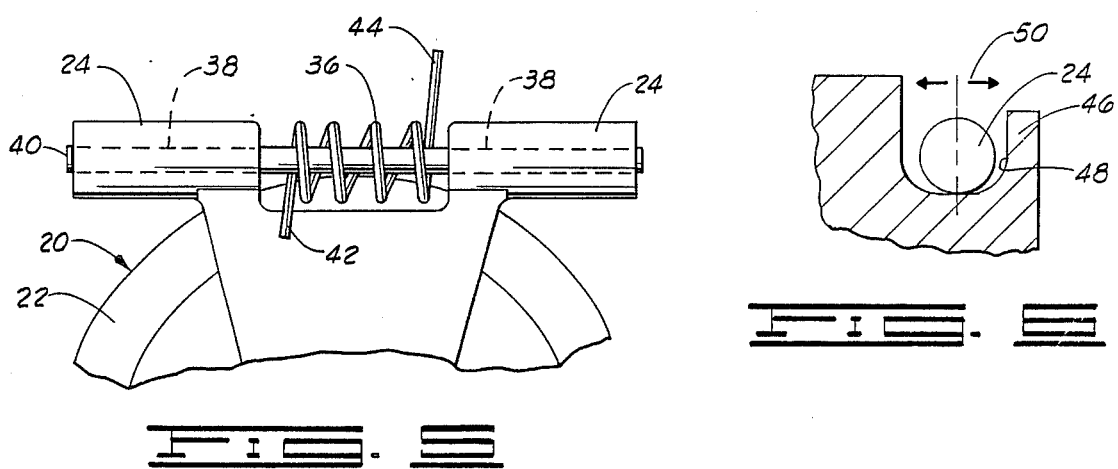

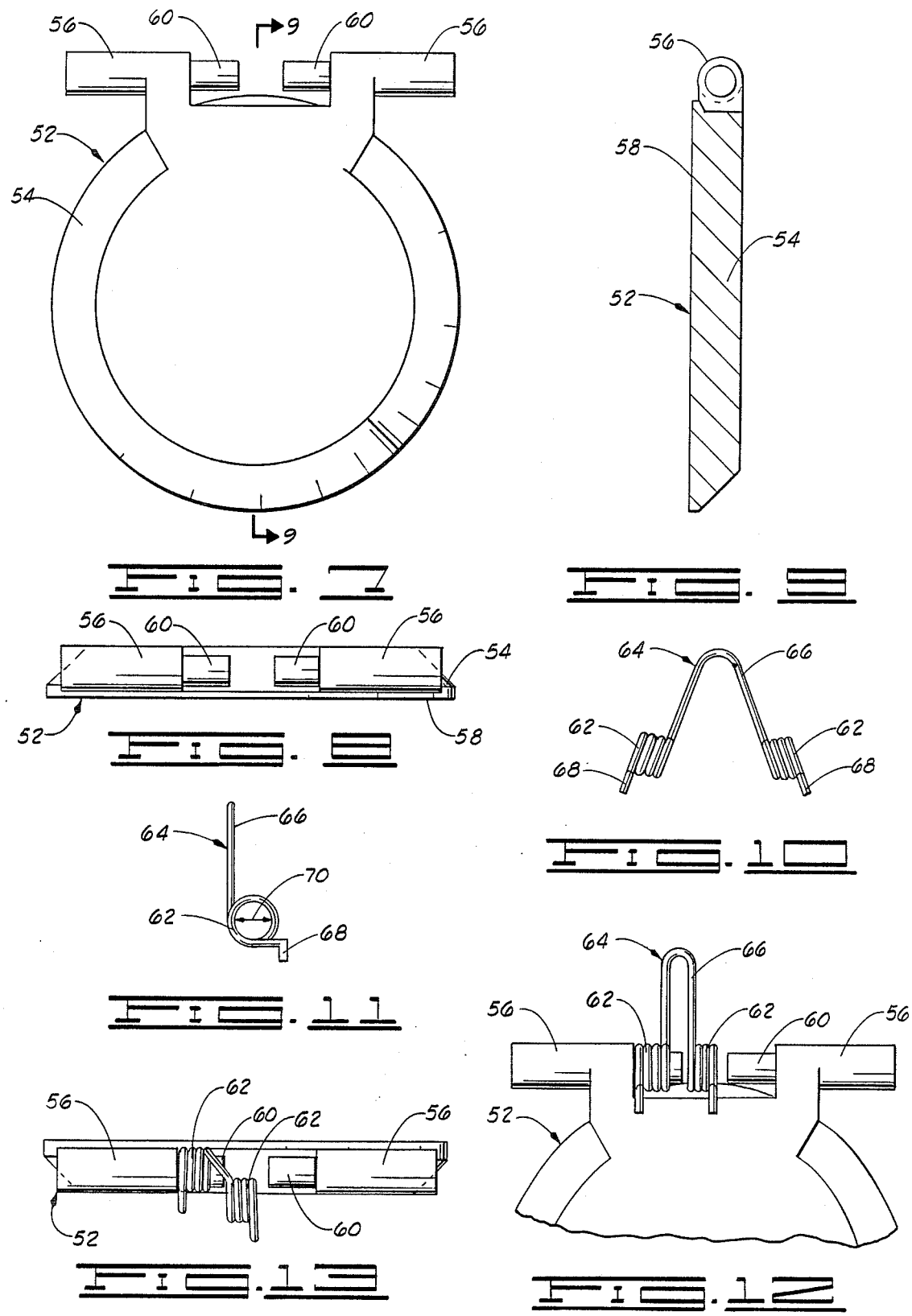

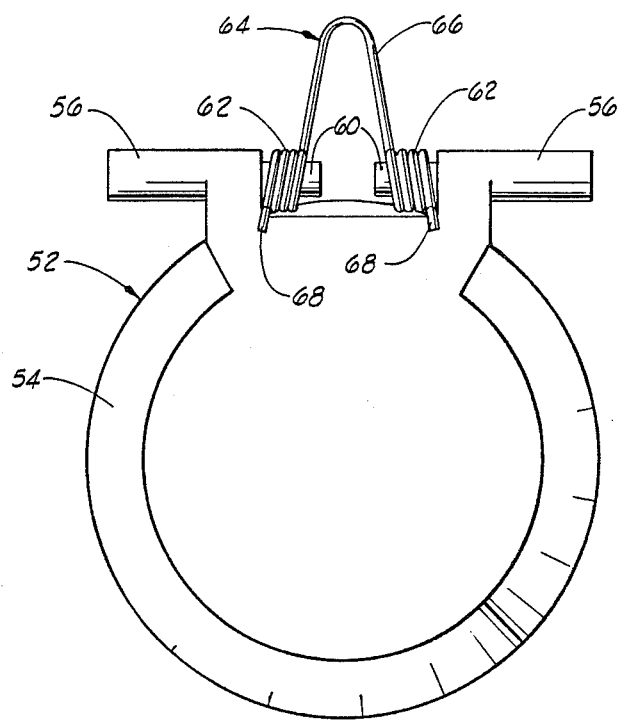
FIG. 14
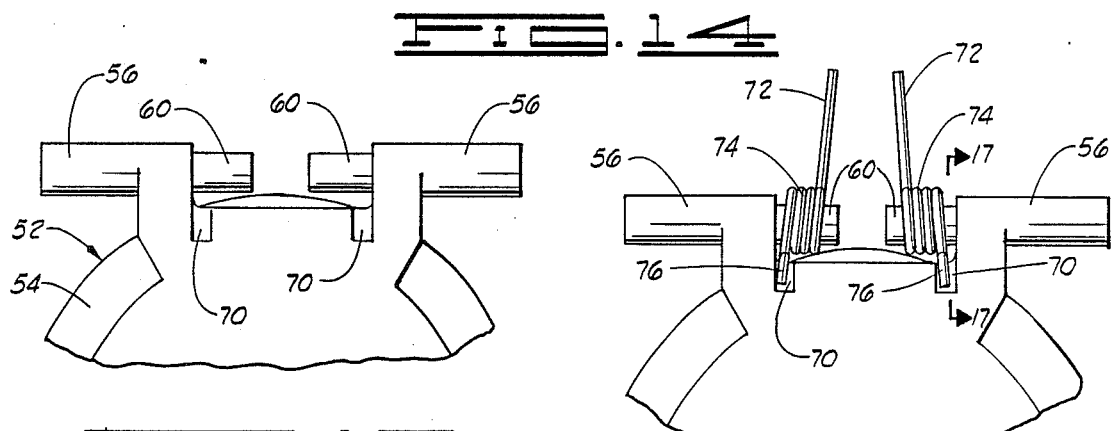
FIG. 15
FIG. 16
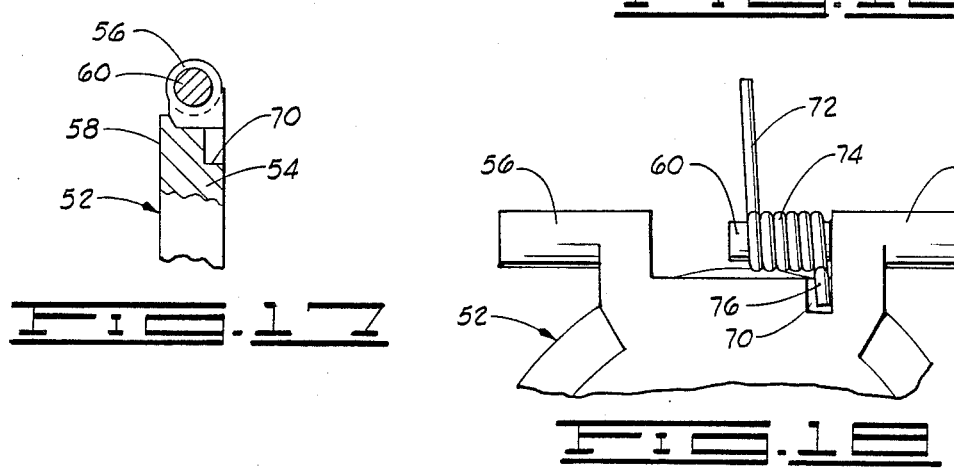
FIG. 17
FIG. 18

SWING CHECK VALVE DISC

CROSS REFERENCE TO RELATED APPLICATIONS

This is a continuation-in-part of application Ser. No. 023,786, filed Mar. 9, 1987, entitled CHECK VALVE, now abandoned and application Ser. No. 049,383, filed May 13, 1987 entitled SWING CHECK VALVE.

BRIEF SUMMARY OF THE INVENTION

1. Field of the Invention.

This invention relates to improvements in swing check valves, and more particularly to an improved disc for a swing check valve.

2. Background of the Invention.

In at least the great majority of swing check valve designs, it is very important to the efficiency and longivity of the valve for the hinge pin or pins of the valve disc to be on an axis as precisely parallel as possible to the sealing face of the disc. If the hinge pins are not properly arranged with respect to the sealing face, the disc does not close evenly—resulting in inefficient valve closure and accelerated wear. Nevertheless, the common practice in the art is to mount the hinge pins in bores through an extension of the disc or mount the hinge pins on a separate extension bolted or otherwise secured to the disc. In each instance, it is very difficult to maintain the proper parallel arrangement between the axis of the hinge pins and the sealing face of the disc.

Another feature of swing check valve designs which has not been given sufficient interest is the radius of the arc through which the disc swings. The larger the arc, the greater the effective weight of the disc and the greater the space required for movement of the disc.

Various designs of springs have been employed in swing check valves to assist the movement of the disc into a closed position. Heretofore, however, such spring returns are not commonly used with discs in supporting structure designs where the disc can float in its final closing movement and initial opening movement. As a general rule, a disc which can float provides a more effective closing action with a longer service life.

BRIEF DESCRIPTION OF THE DRAWINGS

FIG. 1 is an elevational view of one side of a valve disc constructed pursuant to this invention.

FIG. 2 is a cross-sectional view taken along lines 2—2 of FIG. 1.

FIG. 3 is a top view of the disc shown in FIGS. 1 and 2.

FIG. 4 is an enlarged elevational view of a portion of the disc looking at the side opposite to that seen in FIG. 1.

FIG. 5 is an illustration of one form of return spring and mounting arrangement for a disc such as that shown in FIGS. 1 through 4.

FIG. 6 is a schematic illustration of a hinge pin and hanger for a floating disc.

FIG. 7 is an elevational view of a modified disc.

FIG. 8 is a top view of the disc shown in FIG. 7.

FIG. 9 is a cross-sectional view taken along lines 9—9 of FIG. 7.

FIG. 10 is a form of return spring which may be used with the disc of FIGS. 7 through 9.

FIG. 11 is an end view of the return spring shown in FIG. 10.

FIG. 12 is an illustration of the manner of installation of the spring of FIG. 10 on the disc of FIG. 7.

FIG. 13 is a top view of the illustration of FIG. 12.

FIG. 14 is an elevational view of the disc of FIG. 7 with the spring of FIG. 10 fully mounted thereon.

FIG. 15 is a modification of the FIG. 7 disc.

FIG. 16 is an elevational view of a portion of the disc of FIG. 15 having a pair of return springs mounted thereon.

FIG. 17 is a cross-sectional view taken along 17—17 of FIG. 16, with the spring removed.

FIG. 18 is a partial elevational view of a further modified disc and return spring arrangement.

DETAILED DESCRIPTION OF THE DRAWINGS

Referring to the drawings in detail, and particularly of FIGS. 1, 2 and 3, reference character 20 generally designates a valve disc constructed in accordance with this invention. The disc 20 basically comprises a plate-like body 22 which is substantially round in configuration, and a pair of cylindrical hinge or bearing pins 24 integrally formed with the body 22. The hinge pins 24 are axially aligned and in end-to-end spaced relation and are, of course, provided for journaling the disc in a valve. The termi-nology "integrally formed" as used herein means that the hinge pins 24 and the body 22 are formed in a single operation, such as by casting, typically investment casting, even though some machine work may be required on the disc following the formation thereof. As shown most clearly in FIG. 2, an annular sealing face 26 is formed on one side of the body 22. A cavity 28 is formed radially inwardly of the sealing face 26 to properly distribute the mass of the body 22. As can be seen in FIG. 2, with this arrangement, the greater mass of the body 22 is to the right of the center line of the hinge pins 24, whereby the disc will tend to be closed by gravity when the hinge pins 24 are disposed horizontally.

As indicated by the horizontal lines in FIG. 3, it is important that the center lines of the hinge pins 24 be parallel with the plane formed by the sealing face 26. With this arrangement, the sealing face 26 will be more likely to contact the mating valve seat (not shown) around the entire surface area of the sealing face.

As shown in FIG. 4, the center line of the hinge pins 24 is spaced a distance indicated by the arrows 30 radially outward (with respect to the body 22) from the tangient 32 of the adjacent outer peripheral edge of the body 22. The spacing 30 determines the radius of the swing arc of the disc 20, which in turn affects the total space which must be provided for the swinging motion of the disc and has a major effect on the effective weight of the disc. The spacing 30 should be maintained at a minimum which will permit the initial opening movement and final closing movement of the disc without interference between the edge portion 34 of the disc and the mating valve seat. Preferably, the spacing 30 is maintained between about 0.03 and 0.125 inches. As also shown in FIG. 4, the spacing 30 is less than the radius 35 of the cylindrical bearing pins 24.

The valve disc 20 may be modified to utilize a return spring 36 as illustrated in FIG. 5. The hinge pins 24 are provided with axially aligned bores 38 to receive a spring retainer pin 40 therein. The spring 36 is a coil spring, as shown, with the coils thereof encompassing the pin 40 in the space between the adjacent ends of the hinge pins 24. One end portion 42 of the spring 36 engages the side of the body 22 opposite the sealing face 26. The other end portion 44 of the spring 36 engages a stationary portion (not shown) of the valve in which the disc is installed. With this arrangement, the spring 36 will urge the disc 20 into a closed position. Also, as will be made more clear later, the inner diameter of the coils of the spring 36 is larger than the outer diameter of the spring retainer pin 40 in any operating position of the spring, including the most stressed condition of the spring. With this arrangement, the spring 36 will not bind on the pin 40. It should also be noted that the spring 36 will be effective even though the pin 40 is not precisely aligned with the pins 24.

With the spring arrangement illustrated in FIG. 5, the hinge pins 24 can float in hangers 46 (FIG. 6) formed in the swing check valve to provide bearing areas 48 having a width greater than the diameter of the hinge pins 24. This floating movement is illustrated by the arrows 50 in FIG. 6.

A modified valve disc 52 is illustrated in FIGS. 7, 8 and 9. The disc 52 comprises a plate-like body 54 having a substantially round configuration and hinge pins 56 formed integrally therewith. The hinge pins 56 are axially aligned and the axes thereof are parallel with the sealing face 58 formed on one side of the body 54. As shown, the hinge pins 56 are in spaced apart relation and a spring retainer pin 60 projects from each hinge pin 56 toward the opposite hinge pin. The spring retainer pins 60 are preferably formed integrally with the hinge pins 56 and are at least nominally axially aligned.

The spring retainer pins 60 are provided to receive a pair of coiled sections 62 of a retainer spring generally designated by reference character 64 (FIG. 10). The coiled sections 62 are interconnected by a U-shaped bight portion 66. The opposite end portions 68 of the spring 64 are bent (FIG. 11) to a condition essentially parallel with the bight portion 66. The inner diameter of each coil section 62, indicated by the line 70 in FIG. 11, is greater than the outer diameters of the spring retainer pins 60 in all operating conditions of the spring 64.

FIGS. 12 and 13 illustrate a preferred method of installation of the spring 64 on the spring retainer pins 60. The coil sections 62 are moved relatively together by bending the bight portion 66 and one of the coil sections 62 is inserted over one of the spring retainer pins 60. The bight portion 66 is then again bent to align the second coil section 62 with the remaining spring retainer pin 60. Relaxation of the stress in the bight portion 66 will then permit the last-mentioned coil section 62 to telescope over the remaining spring retainer pin 60 into the assembled position illustrated in FIG. 14. In this position, the end portions 68 of the spring 64 will engage the side of the body 54 opposite the sealing face 58 and the bight portion 66 can be placed in engagement with a stationary portion (not shown) of the valve in which the disc is used. With this arrangement, the spring 64 will urge the disc 52 toward a closed position.

As shown in FIGS. 15, 16 and 17, the disc 52 may be modified by the provision of rectangular notches 70 in the side of the body 54 opposite the sealing face 58 adjacent the inner ends of the hinge pins 56. This modified construction may be employed with the spring 64 previously described, such that the end portions 68 of the spring 64 can fit within and be retained in the notches 70. Or, a separate spring 72 may be used on each spring retainer pin 60 as illustrated in FIG. 16. In this arrangement, the coil section 74 of each spring 72 fits over one of the spring retainer pins 60 and one end portion 76 thereof is positioned in the respective notch 70 to anchor the spring 72 in the desired operating position. The opposite end portion of the spring 72 will then be arranged to engage a stationary portion (not shown) of the valve in which the disc is used.

Alternatively, as shown in FIG. 18, a single hinge pin 60 may be employed with one of the hinge pins 56, and a single spring 72 is provided with its coil section 74 around the single pin 60 and the spring 72 anchored in position by the end 76 thereof being installed in the notch 70.

Changes may be made in the combination and arrangement of parts or elements as heretofore set forth in the specification and as shown in the drawings without departing from the spirit and scope of the invention as defined in the following claims.

What is claimed is:

1. A disc for a swing check valve, comprising:
    a plate-like, substantially round body having an annular sealing face on one side thereof; and
    hinge pin means formed integrally with the body for journaling the disc in the swing check valve, said hinge pin means providing a pair of axially aligned cylindrical bearing pins having their axes parallel with said sealing face and a tangent to the adjacent outer periphery of the body, the positions of said bearing pins relative to said body being such that said axes are radially outward of said tangent and the spacing between said axes and said tangient is less than the radius of said bearing pins.

2. A disc as defined in claim 1 wherein the mass of the body is distributed to urge the disc to a closed position in the valve when said axes extends substantially horizontally.

3. A disc as defined in claim 1 wherein a cavity is formed in said body radially inwardly of said sealing face.

4. A disc as defined in claim 1 wherein said spacing is between about 0.03 and 0.125 inches.

5. A disc as defined in claim 1 wherein there is a space between the bearing pins and characterized further to include:
    a spring retainer pin mounted in mating bores in the bearing pins; and
    a coil spring around the spring retainer pin between the bearing pins having one end portion engaging the side of said body opposite the sealing face and the other end portion extended for engagement with a stationary portion of the valve, whereby the spring urges the disc closed.

6. A disc as defined in claim 5 wherein the inner diameter of the coils of the spring surrounding the spring retainer pin is larger than the outer diameter of the spring retainer pin in all operating positions of the spring.

7. A disc as defined in claim 1 wherein there is a space between the bearing pins and characterized further to include:
    a spring retainer pin projecting from at least one of the bearing pins in the space between the bearing pins; and
    a coil spring having the coils thereof surrounding the spring retainer pin, one end portion of said spring engaging the side of said body opposite the sealing face and the other end portion of the spring extended for engagement with a stationary portion of the valve, whereby the spring urges the disc closed.

* * * * *